(12) United States Patent
Saxena et al.

(10) Patent No.: US 10,749,740 B2
(45) Date of Patent: Aug. 18, 2020

(54) DEPLOYING NETWORK-BASED CLOUD PLATFORMS ON END EQUIPMENT

(71) Applicant: HEWLETT PACKARD ENTERPRISE DEVELOPMENT LP, Houston, TX (US)

(72) Inventors: Vinay Saxena, Richardson, TX (US); Arun Thulasi, Cupertino, CA (US); Puneet Sharma, Palto Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/799,266

(22) Filed: Oct. 31, 2017

(65) Prior Publication Data

US 2019/0132197 A1 May 2, 2019

(51) Int. Cl.
*H04L 12/24* (2006.01)
*H04L 29/08* (2006.01)
*H04L 12/26* (2006.01)

(52) U.S. Cl.
CPC .......... *H04L 41/0803* (2013.01); *H04L 67/10* (2013.01); *H04L 41/0886* (2013.01); *H04L 41/147* (2013.01); *H04L 43/08* (2013.01)

(58) Field of Classification Search
None
See application file for complete search history.

(56) References Cited

U.S. PATENT DOCUMENTS

| | | | | |
|---|---|---|---|---|
| 9,712,386 B1 * | 7/2017 | Chen | ................... | H04L 41/0806 |
| 2005/0060722 A1 * | 3/2005 | Rochette | ................... | G06F 8/60 |
| | | | | 719/319 |
| 2010/0250748 A1 * | 9/2010 | Sivasubramanian | ........................ | |
| | | | | G06F 11/3442 |
| | | | | 709/226 |
| 2012/0182862 A1 * | 7/2012 | Cirkovic | .................. | H04L 45/66 |
| | | | | 370/220 |
| 2012/0303818 A1 * | 11/2012 | Thibeault | ................ | H04L 67/10 |
| | | | | 709/226 |
| 2013/0232497 A1 * | 9/2013 | Jalagam | .................... | G06F 8/61 |
| | | | | 718/104 |
| 2014/0336791 A1 * | 11/2014 | Asenjo | .................. | G05B 13/026 |
| | | | | 700/44 |
| 2015/0071053 A1 * | 3/2015 | Kempf | ................ | H04L 41/0695 |
| | | | | 370/216 |
| 2015/0324182 A1 * | 11/2015 | Barros | ................ | G06F 9/44505 |
| | | | | 717/174 |
| 2015/0324183 A1 * | 11/2015 | Fisher | ....................... | G06F 8/41 |
| | | | | 717/176 |
| 2016/0043971 A1 * | 2/2016 | Marr | ....................... | H04L 41/12 |
| | | | | 370/254 |

(Continued)

OTHER PUBLICATIONS

"Edge Computing", Wikipedia; published on or before Oct. 31, 2017, 4 pages; https://en.wikipedia.org/wiki/Edge_computing.

(Continued)

*Primary Examiner* — Sargon N Nano
*Assistant Examiner* — Christopher B Robinson
(74) *Attorney, Agent, or Firm* — Trop, Pruner & Hu, P.C.

(57) ABSTRACT

The technique includes determining parameters of a cloud platform associated with an edge computing service associated with a network. The technique includes deploying the cloud platform, including configuring equipment external to the network and configuring equipment of the network.

17 Claims, 5 Drawing Sheets

(56) References Cited

U.S. PATENT DOCUMENTS

| | | | | |
|---|---|---|---|---|
| 2016/0156513 | A1* | 6/2016 | Zhang | H04L 41/00 709/220 |
| 2016/0212012 | A1* | 7/2016 | Young | G06F 9/45558 |
| 2016/0344590 | A1* | 11/2016 | Huey | H04Q 1/13 |
| 2016/0364304 | A1* | 12/2016 | Hanumantharaya | G06F 9/45558 |
| 2017/0063989 | A1* | 3/2017 | Langouev | G06F 9/5083 |

OTHER PUBLICATIONS

"Mobile Edge Computing"; Wikipedia; published on or before Oct. 31, 2017; 3 pages; https://en.wikipedia.org/wiki/Mobile_edge_computing.

Nokia; "AirGile Cloud-Native Core Network"; Nokia Networks; published on or before Oct. 31, 2017; 4 pages; https://networks.nokia.com/solutions/cloud-native-core-network.

Nokia; "Telco Cloud—Manage Sudden Data Growth with Unlimited Capacity"; Nokia Networks; published on or before Oct. 31, 2017; 7 pages; https://networks.nokia.com/solutions/telco-cloud.

Atlantic ACM, "Old-School Solutions for One of Telecom's Dirty Little Secrets", available online at <https://www.atlantic-acm.com/old-school-solutions-for-one-of-telecoms-dirty-little-secrets/>, 2016, 4 pages.

Davy et al., "Challenges to Support Edge-as-a-Service", Jan. 16, 2014, 7 pages.

Dell Inc., "Dell EMC NFV Ready Bundle for Red Hat," 2018, https://www.emc.com/collateral/solution-overview/h17005-1-dell-emc-nfv-ready-bundle-red-hat-solution-brief.pdf.

Evolven, "Downtime, Outages and Failures—Understanding Their True Costs", available online at <https://www.evolven.com/blog/downtime-outages-and-failures-understanding-their-true-costs.html>, Nov. 25, 2015, 7 pages.

Heinrich, "Telecom Companies Count $386 Billion in Lost Revenue to Skype, WhatsApp, Others", available online at <http://fortune.com/2014/06/23/telecom-companies-count-386-billion-in-lost-revenue-to-skype-whatsapp-others/>, Jun. 23, 2014, 4 pages.

Huawei leading-edge data center solution and modular UPS become cynosure of DCW, available online at <https://www.huawei.com/en/press-events/news/2016/4/leading-edge-data-center-solution>, Apr. 14, 2016, 4 pages.

Nokia, "Operationalizing Lean NFV Operations", available online at <https://onestore.nokia.com/asset/190810>, Achieving cloud agility and efficiency in networks, 2015, pp. 1-17.

SuperMicro Computer, Inc., "Supermicro Total Solution for Canonical OpenStack," 2019, https://www.supermicro.com/en/solutions/canonical.

* cited by examiner

DEPLOYING NETWORK-BASED CLOUD PLATFORMS ON END EQUIPMENT

BACKGROUND

Edge computing allows cloud computing resources to be located near the outer periphery, or edge. of the network. For example, for a cellular wireless telecommunications network, cloud computing resources may be deployed in base stations or cell aggregation sites of the network. Edge computing, among its various benefits, reduces network congestion and allows a more rapid response to events occurring at the edge of the network.

DETAILED DESCRIPTION

Figure 1:
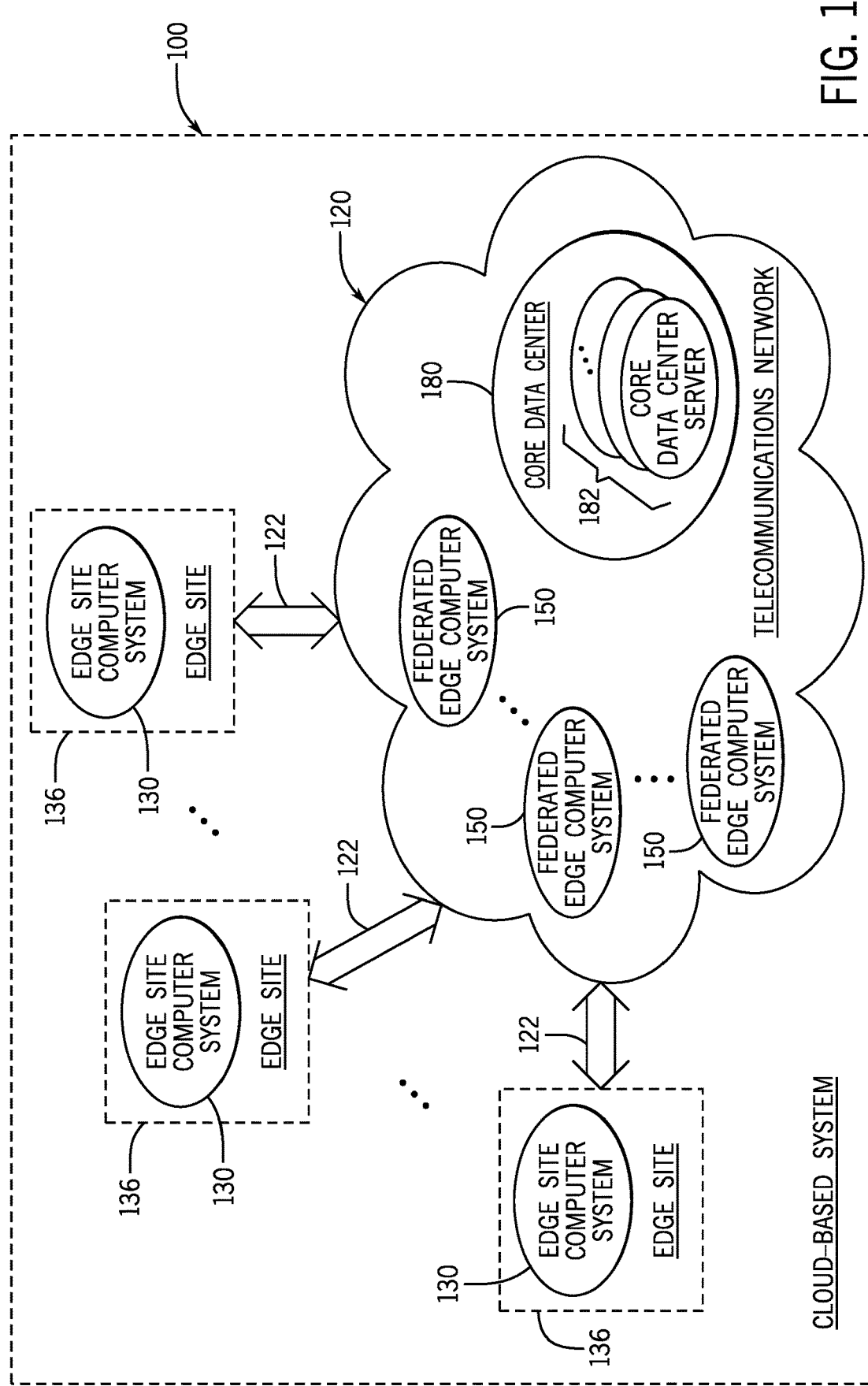
FIG. 1 is a schematic diagram of a cloud-based system to provide an edge computing service according to an example implementation.

A network (a wireless telecommunications network, such as a cellular network, for example) may provide Edge as a Service (EaaS), an edge computing service, which allows resources of the network, which are geographically located near the network's outer periphery, or edge, to serve end devices. In this manner, the resources of the network may include computing resources as well as storage resources for purposes of storing and processing data content in relatively close proximity to the end devices. An "end device" refers to any electronic component that may communicate with the network, such as a smartphone, a tablet computer, a portable computer, a wearable device, robots, an industrial Internet of Things (IoT) device, and so forth. More specifically, EaaS may provide resources local to end devices for such purposes as reducing network congestion; improving response times to requests submitted by the end devices; allowing relatively flexible and fast deployment of applications for the end devices; and so forth.

As a more specific example, EaaS may serve end devices, which acquire and communicate relatively large streams of data. For example, the end device may be an IoT device, which may acquire sensed data (data pertaining to a manufacturing process state, a state pertaining to a vehicle fleet, and so forth) and communicate the sensed data to the network. The data acquired by the IoT device may be voluminous and may be time sensitive in that the data may not be relevant in the future. The EaaS allows the local resources of the network to be geographically deployed close to the edge of the network to permit a relatively rapid response to changing conditions indicated by the sensed IoT data. Moreover, the EaaS may reduce the volume of data that is otherwise communicated and stored on data centers located in the core/middle of the network.

As another example, EaaS may allow social media-based applications to respond to end devices without unduly loading the core network. For example, EaaS may allow end devices associated with a particular customer site, such as a sports venue, to service social media demands arising from a particular sporting event.

As another example, EaaS may allow map data to be provided to end users from edge-deployed resources for navigation augmentation purposes.

Regardless of the particular use of EaaS, there may be a time line related to implementing a particular innovative idea as an EaaS. In this manner, service providers may desire to order and rapidly deploy edge platforms so that revenue generating applications may be quickly deployed at relatively low costs. More specifically, the cloud market is ever expanding in that network equipment providers (NEPs) and Communication Service Providers (CSPs) are trying to address the social media-based demand presented by Over the Top (OTT) services and other platforms by increasingly building a network of clouds that are connected by intelligent edge services. This means that it may be quite beneficial for NEPs and CSPs to create, provide and terminate dynamic services at a relatively fast rate. Moreover, for such deployed cloud platforms, NEPs and CSPs may also be faced with potentially higher losses and penalties due to failures to comply with service level agreement (SLA) metrics. In this manner, a particular EaaS that does not meet its SLA metrics may be impacted by the associated penalties of noncompliance.

In accordance with example implementations that are described herein, the network may be a wireless telecommunications network (a cellular telecommunications network, for example), and a cloud platform associated with an EaaS may be deployed on components of the network. The cloud platform may include components that are associated with a data center, edge components and components that are deployed on customer end computer sites (at one or more edge sites) that communicate with the network. Moreover, in accordance with example implementations, the cloud platform may be managed so that the end computer sites are completely intelligent and independent so as to keep the services up and running at all times. In this manner, in accordance with example implementations, the resources (computing, networking and/or storage resources, for example) of the cloud platform, including the resources on the end computer sites, may be automatically managed.

In accordance with example implementations, the automatic management may include automatically scaling up or scaling down resources of the cloud platform based on monitored system performance and monitored system load; maintaining a high availability (HA) to allow failover in the case of a detected failure; and so forth. Moreover, in accordance with example implementations, the systems and techniques that are described herein automatically manage components that are HA-unaware (legacy components, for example) to cluster such HA-unaware components together so that the cluster of legacy components provides HA. Moreover, in accordance with example implementations, the resources associated with the EaaS, as well as the lifecycles of control plane elements may be managed using application programming interfaces (APIs).

More specifically, referring to FIG. 1, in accordance with example implementations, a cloud-based system 100 for providing one or multiple EaaS-based services includes a network 120. In accordance with example implementations, the network 120 may be a telecommunications network, such as a wireless telecommunications network (a cellular telecommunications network, for example). It is noted that, however, in accordance with further example implementations, the network 120 may be a wired telecommunications network, a wireless telecommunications network other than a cellular communication network or a telecommunications network that has fabric to establish both wired and wireless communications.

In accordance with example implementations, the wireless telecommunications network, at its edge, is wireless. It is noted, however, that, in accordance with further example implementations, the last hop of the network may not be wireless.

As depicted in FIG. 1, in accordance with example implementations, the network 120 includes a core data center 180, which may be operated by a service provider. In this manner, the core data center 180 may contain one or multiple core data center servers 182 (i.e, servers provided by one or multiple actual, physical machines), which may provide various media/content-related services, such as services pertaining to providing streaming television, fantasy content, game content, cloud-based digital video recording (DVR), and so forth. Regardless of its particular form, the content services that are provided by the core data center 180 result in corresponding data streams being communicated to end devices (smartphones, tablet computers, portable computers, and so forth), which communicate with the network 120.

In this manner, for this purpose, the network 120 may include physical network fabric (gateways, switches, and so forth), which connect the core data center 180 to federated edge computer systems 150 of the network 120. The federated edge computer systems 150 are deployed near the edge of the network 120. In this manner, the federated edge computer systems 150 may be deployed in or near base stations, radio area network controllers, cell aggregation sites, and so forth. The content provided by the core data servers 182 may be communicated by the federated edge system computers 150 to end devices via wireless communication links 122.

More specifically, for the example implementation that is depicted in FIG. 1, the federated edge computer systems 150 may communicate with one or multiple edge sites 136, which may be associated with customers of a NEP or CSP. Each edge site 136, in turn, may include customer-owned equipment, represented in FIG. 1 by a corresponding edge site computer system 130, which is external to the network 120. The edge site computer system 130 may, for example, serve a particular group of end devices. For example, a particular edge site 136 may be associated with a sports venue (a stadium, a sports arena, and so forth). In this manner, the edge site computer system 130 may execute applications to serve end devices of the sports venue (i.e., serve wireless devices of spectators observing a sporting event, for example). The edge site 136 may be associated with other venues (business centers, shopping centers, convention centers and so forth), in accordance with further example implementations.

In accordance with example implementations that are described herein, the core data center 180 may be constructed to deploy control plane and data plane elements and manage these elements across the cloud-based system 100 for purposes of providing an EaaS. In this manner, this deployment and management may extend across the network 120, as well as on one or multiple edge site computer systems 130.

In this context, the "control plane" refers to the physical components of the cloud-based system 100 related to making decisions that affect network traffic and, in general, define how network traffic is handled (define protocols such as spanning tree, open shortest path first, border gateway protocol, and so forth) in the various network devices of the cloud-based system 120. The "data plane" refers to the actual handling of the network traffic according to the control plane (using forwarding tables, routing tables, queues, and so forth) in the various network devices.

Using network overlay technologies, the core data center 180, in accordance with example implementations, is constructed to deploy and manage elements that form a virtualized network for the EaaS. For example, in accordance with some implementations, the core data center 180 may employ software-defined networking (SDN), which allows different cloud resources (i.e., computing resources, storage resources and network resources) to be logically isolated for different EaaS-based services. In general, the SDN may include an SDN controller with APIs, which allow interaction with cloud deployment and orchestration services. The use of the network overlay technologies allows the automatic configuration of the edge site computer systems 130 for purposes of implementing various EaaS-based services. Moreover, as described herein, the core data center 180 may be constructed to extend distributed virtual storage across the cloud-based system 100 and onto the edge site computer systems 130.

Moreover, in accordance with example implementations, the core data center 180 is constructed to deploy computing resources (virtual machines (VMs), for example) on the edge site computer systems 130 and manage these computing resources using one of many different virtualization technologies. The service chains that are used to create the edge functions may be orchestrated through one or more orchestrators that are deployed on the edge site computer systems 130.

As further described herein, the core data center 180, in accordance with example implementations, may perform automated management of the EaaS-based services by managing the lifecycle of control plane elements. In this manner, the core data center 180 may include diverse underlying technologies that provide server, storage and network virtualization alongside providing EaaS. In this manner, in accordance with example implementations, the core data center 180 may include one or multiple APIs to provide a generic high availability (HA) service for HA-unaware components of the cloud-based system, such as legacy components. In this manner, the service may, in accordance with example implementations, cluster, or group, HA-unaware components so that should one of the components fail, the service may automatically deploy and start another component of the cluster so that service is uninterrupted.

Figure 2:
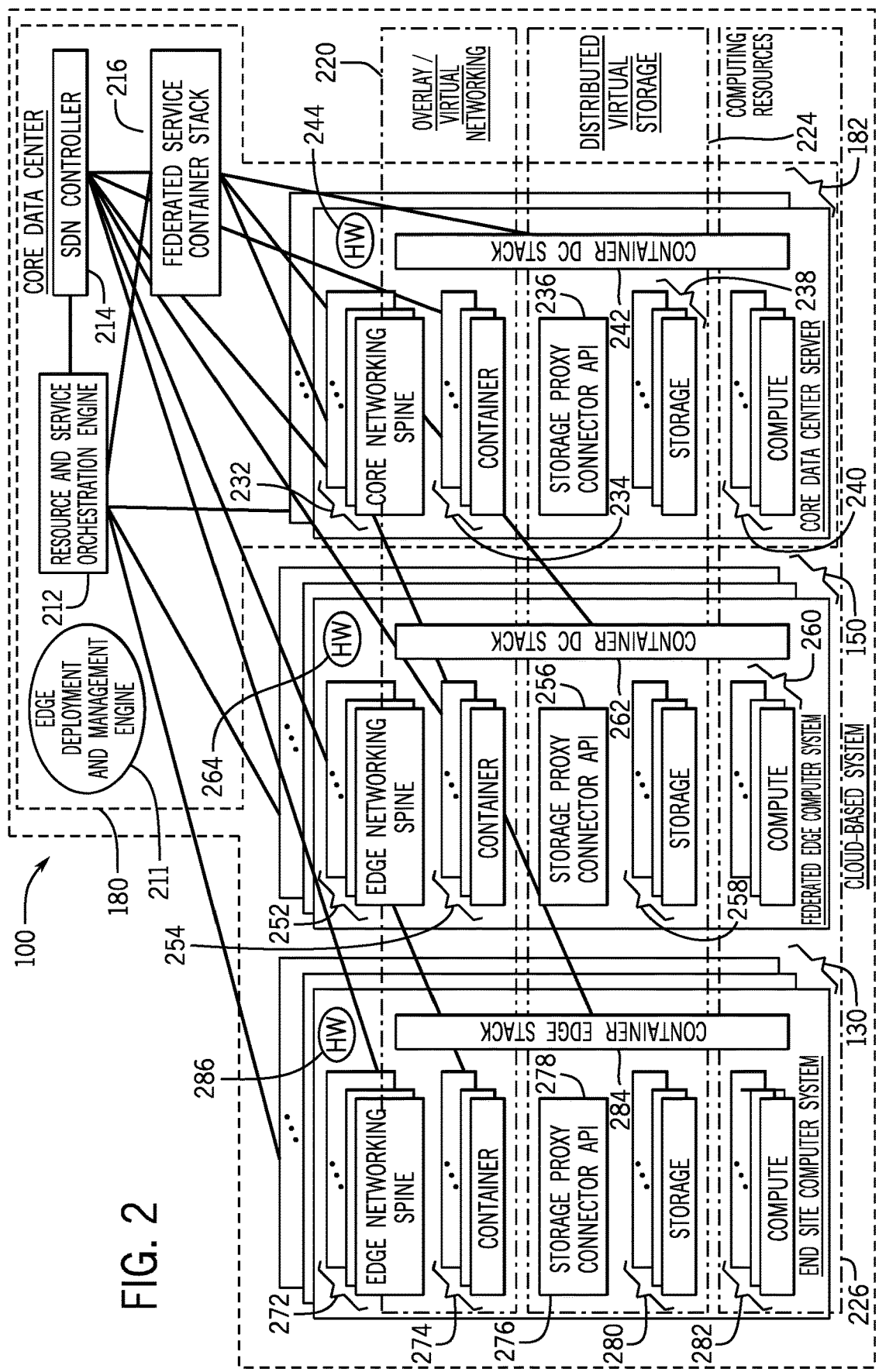
FIG. 2 is a more detailed schematic diagram of the cloud-based system of FIG. 1 according to an example implementation.

Referring to FIG. 2, in accordance with example implementations, the core data center 180 may include an SDN controller 214, which may deploy one or multiple virtualized networks corresponding to one or multiple EaaS-based services. In accordance with some implementations, the SDN controller 214 may use a federated services container stack 216 for purposes of deploying logically-isolated virtualized networks associated with different EaaS-based services.

The virtualized networks may use any of a number of different network overlay technologies, depending on the particular implementation. In this manner, as depicted in FIG. 2, the deployment of the overlay/virtual networking 220 may include the establishment of one or multiple core networking spines 232 on the core data center servers 182, one or multiple edge networking spines 252 on the federated edge computer systems 150, and one or multiple edge networking spines 272 on one or multiple edge site computer systems 130. Moreover, the networking overlay may involve the use of containers from the various computer platforms. In this context, a "container" refers to isolated environments.

In accordance with some implementations, the core data center server 182 may include one or multiple containers 234; the federated edge computer system 150 may include one or multiple containers 254; and the end site computer system 130 may contain one or multiple containers 274. In general, a container on a given host may share a common operating system (OS) kernel and separate applications, runtimes and other services from each other using kernel features. In accordance with further example implementations, the overlay/virtual networking 220 may involve the use of virtual machines (VMs), which also provide isolated environments but provide different OS instances.

As also depicted in FIG. 2, in accordance with example implementations, the core data center 180 may include a resource and service orchestration engine 212, which may, for example, set up a distributed virtual storage 224. In this manner, the resource and service orchestration engine 212 may establish isolated virtual storage and networks for the different EaaS-based networks. In accordance with some implementations, the storage on a particular computer system may be established by corresponding storage proxy connector API. In this manner, as depicted in FIG. 2, the core data center server 182 may include one or multiple storage proxy connector APIs 236; the federated edge computer system 150 may include one or multiple storage proxy connector APIs 256; and the edge site computer system 130 may include one or multiple storage proxy connector APIs 276.

The resource and service orchestration engine 212 may further, in accordance with example implementations, deploy and orchestrate the appropriate computing resources on the various servers of the cloud-based system 100. In this manner, as depicted in FIG. 2, these computing resources may include one or multiple computing resources 240 on the core data center server 182; one or multiple computing resources 260 on the federated edge computer system 150; and one or multiple computing resources 282 on the end site computer system 130.

Each server 130, 150 and 182 may include, in accordance with example implementations, various hardware resources 244, 264 and 286, respectively, such as central processing units (CPUs), memories, and so forth.

Figure 3:
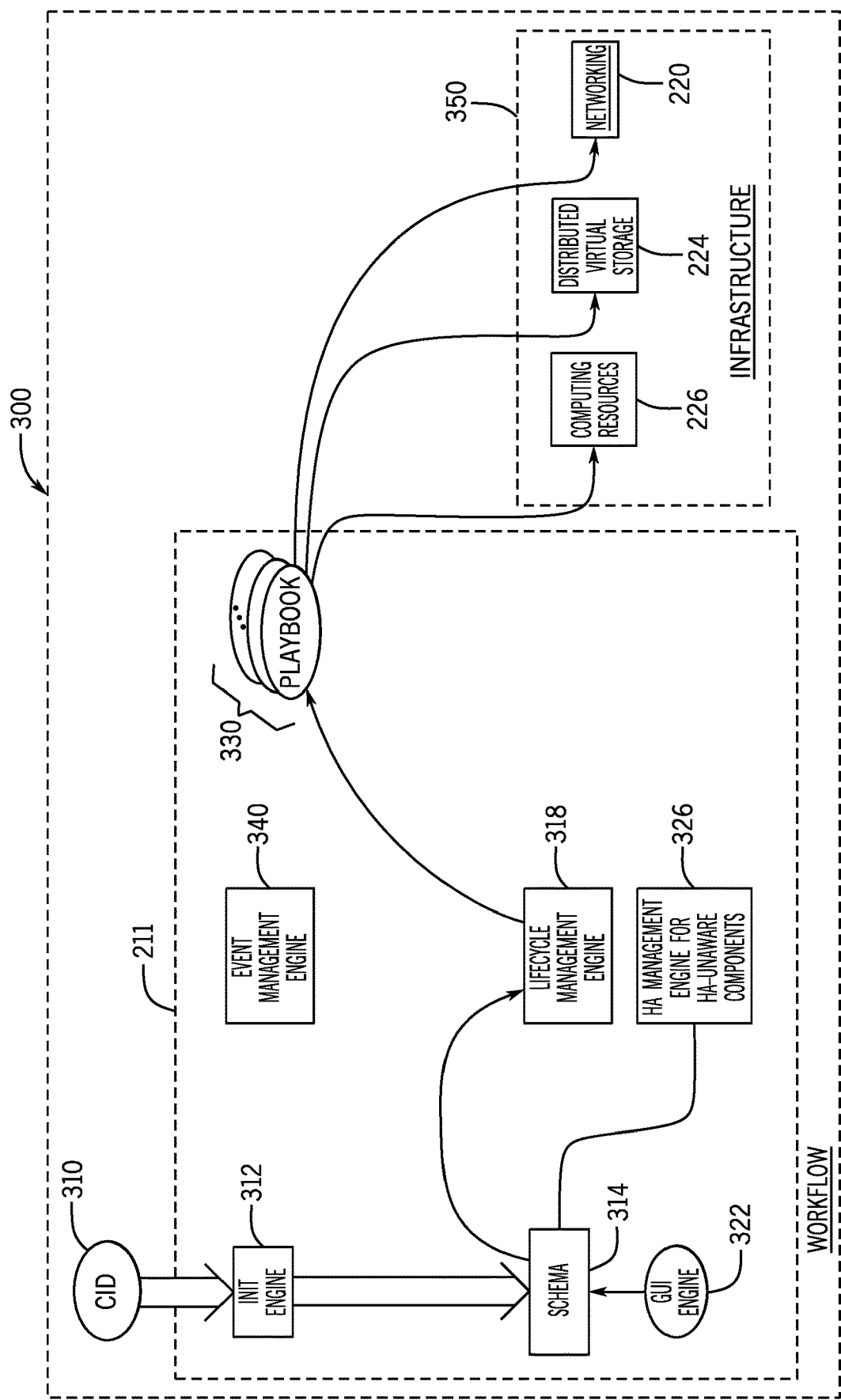
FIG. 3 is a workflow illustrating deployment of elements of a cloud platform to provide Edge as a Service (EaaS) according to an example implementation.

In accordance with example implementations, the core data center 180 may include an edge deployment and management engine 211, which is used to deploy and manage the control plane and data plane elements of the cloud-based system 100. More specifically, FIG. 3 depicts a workflow 300 associated with deploying the components of the cloud-based platform 100, in accordance with an example implementation.

In accordance with example implementations, for purposes of deploying the components for a particular EaaS, a customer may provide data representing a customer inventory document (CID) data 310. In general, the CID data 310 may represent objectives and/or criteria of the EaaS. For example, the CID data 310 may specify the type of bandwidth intended for the deployment; the type of storage and input/output operations per second; how many processing cores are to be deployed for the workload; expected network performance metrics; cloud operating system selection(s); expected platform/service function availability metrics; and so forth. Depending on the particular implementation, the information for the CID data 310 may be collected either through an online tool, or through+h other means.

The CID data 310 may be processed by an initiation engine 312 of an edge deployment and management engine 211. In accordance with example implementations, the initiation engine 312 generates JavaScript Object Notation (JSON) files from the CID data 310. In this manner, the JSON files may specify an infrastructure 350 for the EaaS, such as the computing resources 226, the distributed virtual storage 224 and the virtual networking 220. The initialization engine 312, in turn, may generate schema 314 that provides a snapshot of the complete deployment managed by the edge deployment and management engine 211.

A lifecycle manager engine 318 of the edge deployment and management engine 211 may, in accordance with example implementations, deploy elements in the control and data plane elements of the cloud-based system 100 based on the schema 314. More specifically, to deploy elements, in accordance with example implementations, the lifecycle manager engine 318 may use the schema 314 to generate one or multiple playbooks 330. The playbook 330, in general, is a blueprint to control the deployment of control plane and data plane elements of the cloud-based system 100. In this manner, as depicted in FIG. 3, in accordance with example implementations, the playbooks 330 control the deployment of the control and data plane elements pertaining to the computing resources 226, the distributed virtual storage resources 224 and the networking 220.

In accordance with example implementations, the schema 314 may also be used by a High Availability (HA) engine 326, which provides an HA framework for HA-unaware elements of the edge site computer system 130. In general, HA refers to a system feature in which redundancy is added to the system for purposes of eliminating single points of failure. In other words, the redundancy ensures that failure of a particular component does not mean failure of the entire system such that should a given component on a particular host fail or otherwise become unavailable, the HA framework initiates a process to restart the element on another host. For example, a virtual machine monitor (VMM), or hypervisor, may provide high availability for guest VMs. In this manner, the VMM may communicate with a VMM on another host so that should one of the guest VMs of the first host fail, the second host may restart the VM or VMs that were executed on the first host. Some elements, however, may not be HA capable; and the high availability engine 326 may, in accordance with example implementations, monitor these HA-unaware elements such that if a host for one of these HA-unaware elements should fail, the HA management engine 326 may initiate a process to restart the element on another host. This host may be another server of the same edge site computer system 130, as well as, in accordance with some implementations, another host provided by an edge site computer system 130 deployed at another edge site 136.

In accordance with some implementations, an event management engine 340 may monitor metrics associated with the EaaS for purposes of determining whether elements of a particular edge site computer system 130 should be scaled up or scaled down. For example, a particular edge site 136 may be associated with a sports venue, and correspondingly, for an upcoming sporting event, the event management engine 340 may scale up resources (computing resources, network resources, and so forth) for its edge site computer system 130 and correspondingly scale down the resources at the conclusion of the sporting event. The event management engine 340 may also scale up or scale down resources, depending on a monitored load or performance of the edge site computer system 130.

Moreover, in accordance with example implementations, the event management engine 340 may redistribute resources across one or multiple other edge sites 136. In this manner, in accordance with some implementations, the event management engine 340 may, for example, for a particular event, scale up resources for a particular edge site computer system 130 by using resources at a nearby edge site 136. In this manner, the event management engine 340 may redistribute resources or may pool resources from multiple edge sites 136.

The systems and techniques that are described herein may provide one or multiple of the following advantages, depending on the particular implementation. Zero touch provisioning (ZTP) and management along with rapid deployment of the edge ZTP capabilities enhance the rapid deployment of the cloud-based system and thus, rapid deployment of the EaaS. Zero touch provisioning, in general, refers to deploying control and data plane elements of a cloud-based system automatically, without manual intervention. All infrastructure components (servers, storage, networking components) are deployed automatically across the distributed data center. Infrastructure managers for physical, virtual and service components may be configured dynamically based on key performance indicators (KPIs) to support distributed architecture and provide API access to the customer for consistent management.

The distributed nature of the edge requires that applications preferably be HA aware. However, for applications that are not, the systems and techniques that are described herein provide a common HA framework that ensures availability. Moreover, in accordance with example implementations, a set of tools are provided to obtain important information from the environment, such as representing telemetry, data analytics, rollover upgrades, loss-less in service software upgrade (ISSU), etc. This toolset may be be incrementally expanded to provide additional services while providing the same CLI/API capabilities. The edge deployment and management engine 211 may provide a standard tool set (See FIG. 3, for example), which accounts for key data around telemetry that allows localized and self-sufficient system management.

Figure 4:
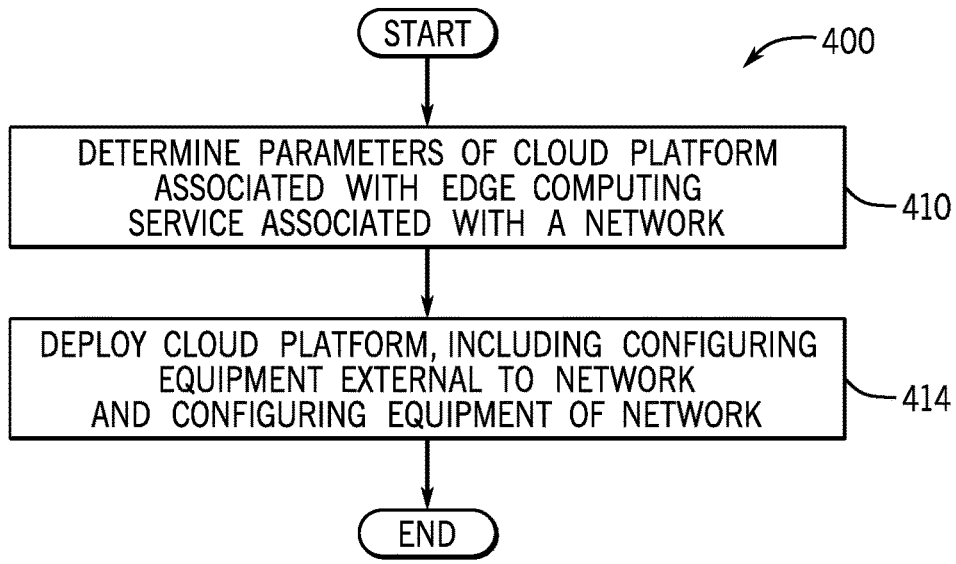
FIGS. 4 and 5 are flow diagrams depicting techniques to deploy a cloud platform for EaaS according to example implementations.

Thus, referring to FIG. 4, in accordance with example implementations, a technique 400 includes determining (block 410) parameters of a cloud platform that is associated with an edge computing service, which, is associated with a network. The technique 400 includes deploying (block 414) the cloud platform including configuring equipment that is external to the network and configuring equipment of the network.

Figure 5:
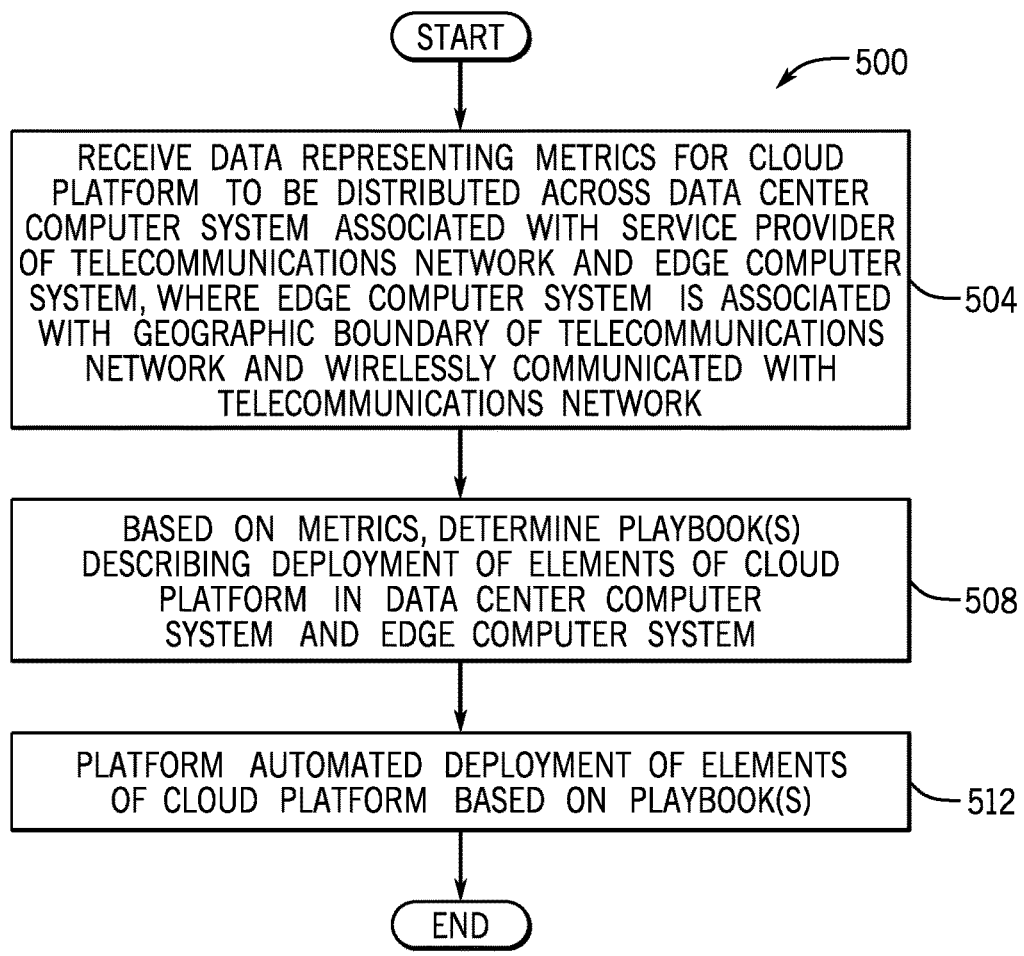

More specifically, referring to FIG. 5, in accordance with example implementations, a technique 500 includes receiving (block 504) data representing metrics for a cloud platform to be distributed across a data center computer system associated with a service provider of a telecommunications network and an edge computer system. The edge computer system is associated with a geographic boundary of the telecommunications network and wirelessly communicates with the telecommunications network. The technique 500 includes based on the metrics, determining (block 508) at least one playbook, which describes deployment of elements of the cloud platform in the data center computer system and in the edge computer system. The technique 500 includes performing (block 512) automated deployment of the elements of the cloud platform based on the playbook(s).

Figure 6:
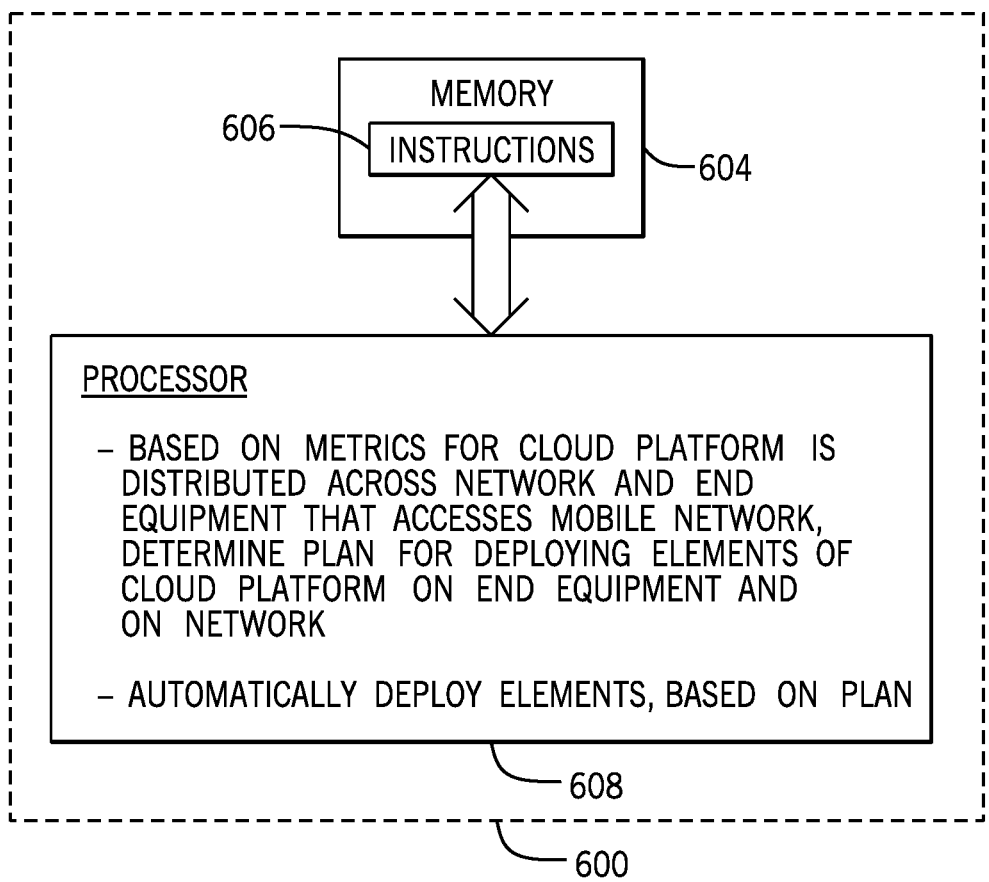
FIG. 6 is an apparatus to deploy a cloud platform for EaaS according to an example implementation.

In accordance with example implementations, an apparatus 600 of FIG. 6 includes a hardware processor 608 and a memory 604 to store instructions 606 that, when executed by the hardware processor 608, cause the hardware processor 608 to, based on metrics for a cloud platform that is distributed across a network and end equipment that accesses the network, determine a plan for deploying elements of the cloud platform on the end equipment and on the network; and automatically deploy the elements based on the plan.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An article comprising a machine readable storage medium to store instructions that, when executed by a machine, cause the machine to:
   receive data representing metrics for a logically-isolated virtualized network of a cloud platform distributed across a plurality of service provider components comprising a data center computer system and federated edge computer system associated with a telecommunications network of a service provider, and at least one or more components of a customer end computer system external to the telecommunications network and wirelessly communicates with the telecommunications network;
   based on the metrics, determine at least one playbook describing deployment of elements of the logically-isolated virtualized network of the cloud platform, the elements being associated with configuring control plane, data plane, and distributed virtual storage and computing resources in the data center computer system, in the federated edge computer system, and in the customer end computer system;
   performing automated deployment of the elements of the logically-isolated virtualized network of the cloud platform based on the at least one playbook,
   wherein automated deployment of the elements of the logically-isolated virtualized network of the cloud platform further comprises establishing one or more networking spines on each of the one or more service provider components, the one or more federated edge components, and the one or more customer components of the customer end computer system, and wherein each networking spine on each of the one or more service provider components, each of the one or more federated edge components, and each of the one or more customer components of the at least one customer end computer system, each networking spine comprises a plurality of containers sharing a common operating system kernel but running separate applications, runtimes, and other services from each other container using kernel features.

2. The article of claim 1, wherein the instructions, when executed by the machine, cause the machine to:
   predict an even associated with the logically-isolated virtualized network of the cloud platform impacting an availability or a reliability of the logically-isolated virtualized network of the cloud platform.

3. The article of claim 1, wherein the instructions, when executed by the machine, cause the machine to:

provide a high availability service for a control plane element of the logically-isolated virtualized network of the cloud platform.

4. The article of claim 1, wherein the instructions, when executed by the machine, cause the machine to:
deploy an agent to indicate when a first host of the logically-isolated virtualized network of the cloud platform fails; and
redeploy an element on a second host of the logically-isolated virtualized network of the cloud platform in response to the agent indicating failure of the first host.

5. The article of claim 4, wherein the first and second hosts are located at different geographical locations.

6. A method comprising:
receiving data representing metrics for a logically-isolated virtualized network of a cloud platform to be distributed across a plurality of service provider components comprising a data center computer system and federated edge computer system associated with a telecommunications network of a service provider, wherein the federated edge computer system is associated with a geographic boundary of the telecommunications network, and one or more components of a customer end computer system wherein the customer end computer system is external to the telecommunications network and wirelessly communicates with the telecommunications network;
based on the metrics, determining at least one playbook describing deployment of elements of the logically-isolated virtualized network of the cloud platform, the elements being associated with configuring control plane, data plane, and distributed virtual storage and computing resources in the data center computer system, in the federated edge computer system, and in the customer end computer system; and
performing automated deployment of the elements of the logically-isolated virtualized network of the cloud platform based on the at least one playbook,
wherein automated deployment of the elements of the logically-isolated virtualized network of the cloud platform comprises establishing one or more networking spines on each of the one or more service provider components, the one or more federated edge components, and the one or more customer components of the customer end computer system, and wherein each networking spine on each of the one or more service provider components, each of the one or more federated edge components, and each of the one or more customer components of the at least one customer end computer system, each networking spine comprises a plurality of containers sharing a common operating system kernel but running separate applications, runtimes, and other services from each other container using kernel features.

7. The method of claim 6, wherein the federated edge computer system of the telecommunications network comprises a computer system located at a base station site, a cell aggregation site, or a radio network controller site of the telecommunications network.

8. The method of claim 6, wherein receiving data representing metrics for the logically-isolated virtualized network of the cloud platform comprises receiving data representing an application executing on customer end computer system, a specific attribute or value for a bandwidth, a storage, and an input/output (I/O) rate, a number of processing cores, a network performance metric or an operating system.

9. The method of claim 6, wherein:
the logically-isolated virtualized network of the cloud platform to be distributed on at least one other federated edge computer system, customer end computer system, or a combination of both; and
performing automated deployment of the elements for the logically-isolated virtualized network of the cloud platform comprises deploying elements on the another federated edge computer system, customer end computer system, or the combination of both based on the at least one playbook.

10. The method of claim 6, wherein the elements comprise data plane elements.

11. The method of claim 6, wherein the elements comprise control plane elements, the method further comprising providing an application programming interface (API) to manage the elements.

12. The method of claim 6, wherein performing automated deployment of the elements comprises deploying a distributed storage spanning across the data center computer system, the federated edge computer system, and the customer end computer system.

13. The method of claim 6, wherein performing automated deployment of the elements comprises deploying a distributed virtual network spanning across the data center computer system, the federated edge computer system, and the customer end computer system.

14. An apparatus comprising:
a hardware processor; and
a memory to store instructions that, when executed by the hardware processor, cause the hardware processor to:
based on received metrics for a logically-isolated virtualized network of a cloud platform that is distributed across a telecommunications network of a service provider, the telecommunications network comprising a data center and a federated edge computer system, and a customer end computer system that is external to and that wirelessly accesses the telecommunications network, determine at least one playbook describing elements for deployment of the logically-isolated virtualized network of the cloud platform, the elements being associated with configuring control plane, data plane, and distributed virtual storage and computing resources in the data center computer system, in the federated edge computer system, and in the customer end computer system; and
automatically deploy elements of the logically-isolated virtualized network of the cloud platform based on the at least one playbook,
wherein automated deployment of the elements based on the at least one playbook comprises establishing one or more networking spines on each of the one or more service provider components, the one or more federated edge components, and the one or more customer components of the customer end computer system, and wherein each networking spine on each of the one or more service provider components, each of the one or more federated edge components, and each of the one or more customer components of the at least one customer end computer system, each networking spine comprises a plurality of containers sharing a common operating system kernel but running separate applications, runtimes, and other services from each other container using kernel features.

15. The apparatus of claim 14, wherein the instructions, when executed by the processor, cause the processor to deploy a control plane element comprising a physical infrastructure manager, an operating system, a software defined storage or a network controller.

16. The apparatus of claim 14, wherein the instructions, when executed by the processor, cause the processor to:
monitor a performance associated with the federated edge computer system and the customer end computer system; and
redeploy an element installed on the federated edge computer system or the customer end computer system onto another federated edge computer system or customer end computer system in response to the monitored performance.

17. The apparatus of claim 14, wherein the instructions, when executed by the processor, cause the processor to:
monitor a performance associated with the federated edge computer system or the customer end computer system; and
scale an element deployed on the federated edge computer system or the customer end computer system in response to the monitored performance.

\* \* \* \* \*